C. J. HUBER.

FURNACE GRATE.

APPLICATION FILED JUNE 11, 1919.

Reissued June 14, 1921.

15,124.

3 SHEETS—SHEET 1.

Witnesses

Porter H. Flautt.

Emma Wehmeyer

By

Inventor

Charles J. Huber

Edwin F. Samuels

Attorney

C. J. HUBER.

FURNACE GRATE.

APPLICATION FILED JUNE 11, 1919.

Reissued June 14, 1921.

15,124.

3 SHEETS—SHEET 2.

Witnesses.

Porter H. Flautt.

Emma Wehmeyer

Inventor

Charly J. Huber

By Edwin L. Sammels

Attorney

C. J. HUBER.
FURNACE GRATE.
APPLICATION FILED JUNE 11, 1919.
Reissued June 14, 1921.
15,124.
3 SHEETS—SHEET 3.
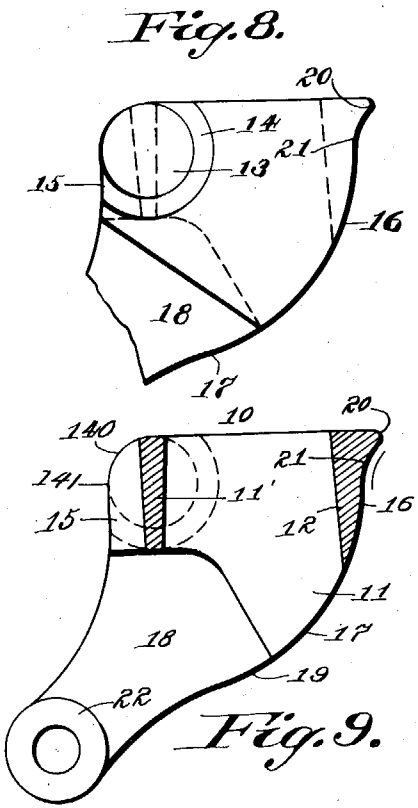
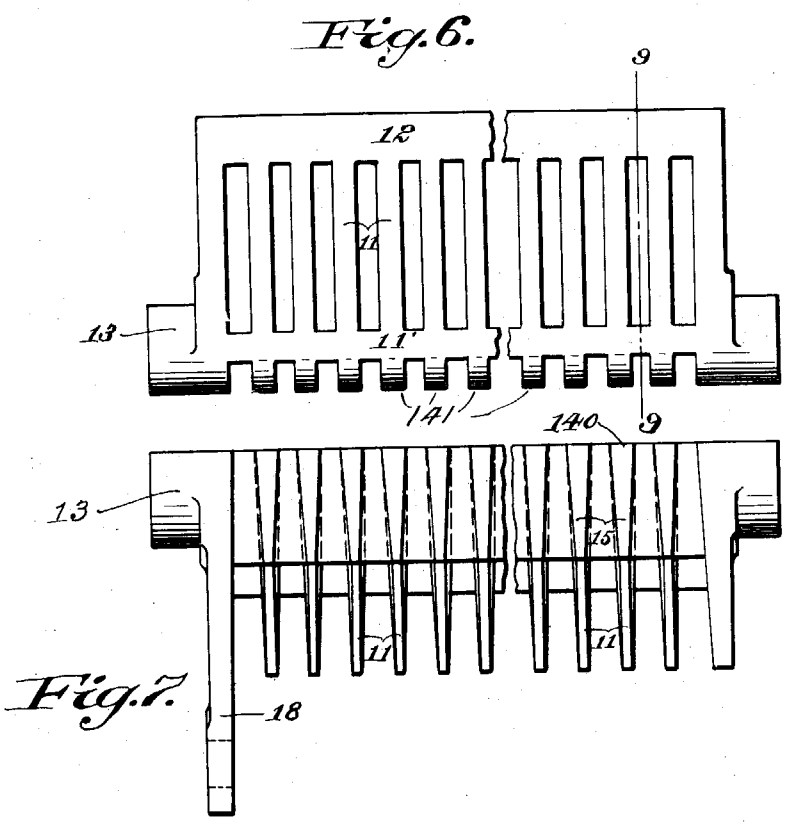
Witnesses,
Porter H. Hault.
Emma Wehmeyer
Inventor
Charles J. Huber
By Edwin R. Sampson
Attorney

UNITED STATES PATENT OFFICE.

CHARLES J. HUBER, OF BALTIMORE, MARYLAND, ASSIGNOR TO HUBER GRATE BAR & STOKING COMPANY, OF BALTIMORE, MARYLAND, A CORPORATION OF DELAWARE.

FURNACE-GRATE.

15,124. Specification of Reissued Letters Patent. Reissued June 14, 1921.

Original No. 1,232,687, dated July 10, 1917, Serial No. 75,503, filed February 1, 1916. Application for reissue filed June 11, 1919. Serial No. 303,526.

*To all whom it may concern:*

Be it known that I, CHARLES J. HUBER, a citizen of the United States of America, residing in the city of Baltimore, State of Maryland, have invented certain new and useful Improvements in Furnace-Grates, of which the following is a specification.

This invention relates to furnace grates, the object in view being to produce a grate of high efficiency by means of which the fuel may be fed along the grate surface while being consumed, at any rate of progress desired by the attendant so that a uniform distribution of the fuel is insured. The construction and operation of the grate is such that the fire may be increased or allowed to diminish in accordance with the heat required. Furthermore, the construction and arrangement is such that the oscillatory grate sections hereinafter more particularly described only protrude into the fire or bed of coals momentarily thereby keeping the grate in a comparatively cool condition and avoiding to a considerable extent the tendency of the grate sections to warp and bind in their bearings. A further object of the invention is to provide in connection with an inclined series of oscillatory grate sections, manually controlled levers and connections whereby groups of alternately arranged sections may be actuated, combined with means for arresting the movement of each manually controlled lever independently of the other and sustaining the fuel supporting surfaces of the grate sections in a common plane. Greater or less movement may be imparted to the grate sections as desired and they may be operated quickly or slowly in accordance with the necessity of advancing the fuel rapidly or slowly.

The important features of the invention which contribute to the result reside in the transversely extending grate sections arranged in downwardly inclined series from front to rear, each section being pivoted at the rear and having a front guard wall, the front surface of the section being of arcuate contour concentric with the pivot. The alternate grate sections are joined in separate sets by manually controlled actuating means which operates by swinging the sectors of each set independently of the other set about their respective pivots, bringing them to or through the vertical so that the coal is fed forward step by step by having the part which is resting upon each grate section which is thus rotated, transferred to the next grate section in front. The provision of a separately actuated drop bar at the rear is also important to this combination because there is otherwise no means of dropping the refuse, the entire fire with the exception of the very finely powdered material being moved forward step by step until it comes to the drop bar from which point, and which point only, it may be discharged.

The structure otherwise defined includes a plurality of rocking or movable sections within the fire-box, of substantial width and elongated transversely of the fire-box. These constitute a sloping, fuel-supporting surface, and the actuating means serving to rock the grate-sections causes the fuel to move down the sloping surface from one section to another and to progressive positions, without materially disturbing the fire, the grate-sections being formed and arranged to conjointly present and maintain a substantially continuous fuel support in both the normal and moving positions of said sections, to prevent dislodgment of the fuel through the grate in the normal supporting and feeding operations or positions of the grate.

With the above and other objects in view, the invention consists in the novel construction, combination and arrangement of parts, as herein described, illustrated and claimed In the accompanying drawings—

Fig. 6 is an enlarged plan view of one of the grate sections.

Fig. 7 is a rear elevation of the same.

Fig. 8 is an end elevation of one of the grate sections.

Fig. 9 is a vertical cross section on the line 9, 9 of Fig. 6.

Figure 1:
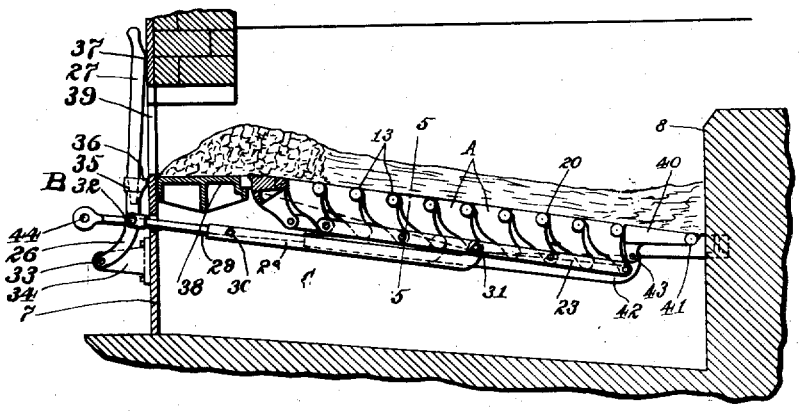
Figure 1 is a vertical section through a furnace, showing the grate of this invention partly in side elevation and partly in section.

Great difficulty has been experienced in producing a grate of such a construction as to insure the uniform feeding of the fuel along the grate surface at a proper rate of progress, and also to enable the rapidity of feed of the fuel to be increased or diminished as required in accordance with conditions existing at any particular time. The grate hereinafter particularly described and illustrated in the drawings has been especially designed to overcome the objections referred to and which up to this time have been fatal to the practical efficiency of grates of the general type embodied in this application.

Figure 4:
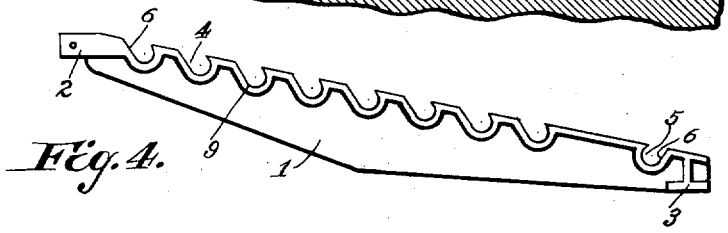
Fig. 4 is an enlarged detail side elevation of one of the supporting bars.

In carrying out the present invention, I employ any suitable number of supporting bars one of which is illustrated in side elevation in Fig. 4. Each supporting bar comprises a substantially vertical web-like body 1 of truss formation, said bar being provided at one end thereof with an attaching lug 2 and provided at the opposite end thereof with a supporting lug 3. In its upper margin the supporting bar is provided with a longitudinal series of journal receiving sockets 4 and 5 and it will be observed that each of said sockets comprises a wall 6 which is substantially straight and is inclined or oblique with respect to the length of the bar, the oblique walls of the sockets 4 inclining toward the front of the furnace and the oblique walls 6 of the socket 5 inclining in the opposite direction or toward the rear wall of the furnace, the front wall of the furnace being indicated at 7 and the rear wall at 8.

Figure 5:
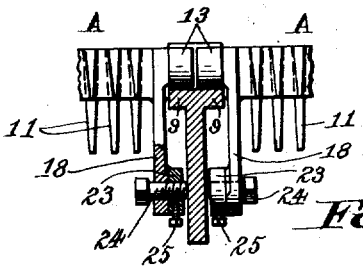
Fig. 5 is a fragmentary vertical cross section on the line 5, 5 of Fig 1, on an enlarged scale.

Each of the supporting bars 1, as shown in Fig. 5, is provided at one side thereof with a laterally projecting flange 9 which extends under the journals of the grate sections hereinafter described and as shown in Fig. 5 and overhangs the connecting rods by which the grate sections are oscillated. Where grate sections are arranged at both sides of a supporting bar 1, the latter is provided with two of such flanges 9 as shown in Fig. 5 and these flanges, whether one or two are employed, follow the outline of the upper marginal edge of the body of the supporting bar including the journal receiving sockets 4 and 5.

Figure 2:
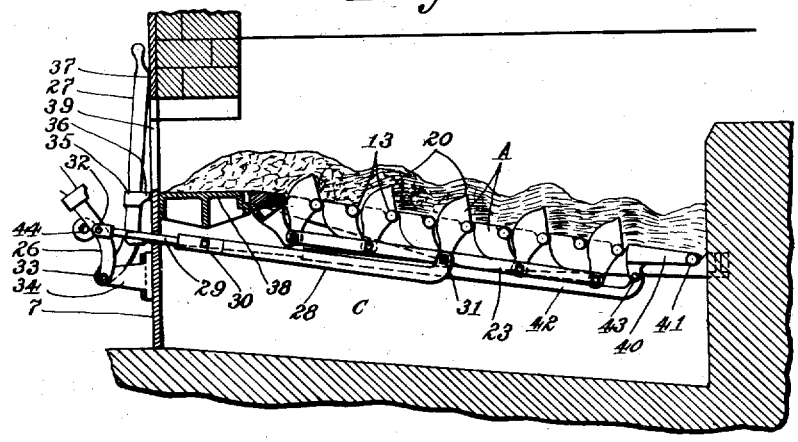
Fig. 2 is a similar view showing one group of grate sections tilted for advancing the coked fuel.
Figure 3:
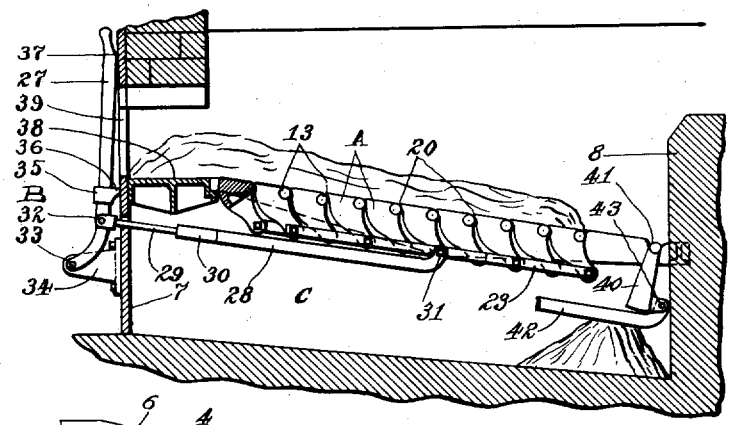
Fig. 3 is a similar view showing the dumping grate section lowered.

The fuel supporting surface of the grate is made up of an inclined series of oscillatory grate sections 10, said series sloping downwardly at a certain predetermined angle from the front toward the rear of the furnace as clearly indicated in Figs. 1, 2 and 3. Each of the grate sections is constructed as best illustrated in Figs. 6 to 9 inclusive, the same comprising a series of parallel grate bars 11 which are connected intermediate their front and rear extremities by means of a stringer bar 11′ and are further connected at their front extremities by means of a guard wall 12. Each of the grate bars 11 is of the shape best illustrated in Fig. 9, the bars 11 being of greater depth or vertical extent at the front than at the rear of the grate section. The grate section is provided at its opposite extremities with projecting journals 13 and is also provided with bearing shoulders or bosses 14 to prevent the operating arms hereinafter described from rubbing against the supporting bars 1 thus reducing friction to a minimum and enabling the grate sections to be oscillated with comparative ease. At their rearward extremities the grate bars 11 are rounded as shown at 140 so as to lie flush with the journals 13. Each grate bar 11 thus comprises a curvilinear portion 140 and a rectilinear portion 15. These projections may be described in a general way as teeth indicated by reference character 141. They have an important function of bearing against the guard wall of the next grate section, preventing the fire from dropping down between the sections and at the same time providing sufficient ventilation so that the adjacent surfaces are cooled and protected from burning. This produces a clinker crushing projection at the rear extremity of the bar 11, the series of clinker crushing projections thus provided on each grate section serving to break up the cinders during the oscillatory movements of the grate sections thus eliminating large clinkers forming under the bed of coals.

The guard wall 12 gradually decreases in thickness from top to bottom as shown in Fig. 9 and the outer surface 16 thereof together with the adjacent edges 17 of the grate bars 11 are described on an arc of a circle of which the axis of the journals 13 is the center. The object in forming the surfaces referred to on the arc above mentioned is to render it possible to rock each grate bar section into the position indicated in Fig. 2 where the fuel supporting top surfaces of certain grate sections are shown as approaching a vertical line without opening the grate or dumping any of the fire. Each grate section is also provided at one end only thereof with an operating arm 18 and a portion of the forward edge of said arm is also described on the aforesaid arc as shown at 19. The shape and angular disposition of the operating arm 18 of each grate section 10 are such that if necessary the fuel supporting top surface of said grate section may be carried beyond the vertical, this being rendered possible by extending the arm 18 obliquely downward and backward with respect to its grate section. This last named feature is clearly illustrated in Figs. 1, 2 and 3 and also in the detail sectional view, Fig. 9.

Figure 10:
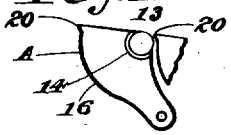
Fig. 10 is an end view of one grate section showing a fragment of the next grate section adjacent the lip, in coöperative relation thereto.

The guard wall 12 has its upper or top portion expanded in width or thickness to form a projecting lip 20 which as shown in Fig. 10 overhangs the adjacent portion of the next grate bar 10, the object of this being to prevent coal from sifting downwardly between the grate sections which would be productive of considerable waste of fuel and also as a stop or support for the grate sections in normal position. The upper marginal portion of the guard wall 12 of each grate section is concaved as at 21 on an arc of a circle of which the axis of the journal of the next grate section to the front 13 is the center. Therefore the clearance space between adjacent grate sections is unvarying and is sufficiently small to prevent waste of coal. This is due especially to the overhanging arrangement of the projecting ledge 20. It will also be noted that the guard wall 12 does not extend downwardly to the full depth of the rear portions of the grate bars 11 and therefore when the grate section is rocked upwardly to the position shown in Fig. 2, free draft will be allowed between the grate bars 11 and thus the draft is not interferred with by said guard wall. The stringer bar 11′ and the grate bars 11 as well as the guard wall 12 gradually decrease in thickness from top to bottom thereby causing them to easily clear themselves from adhering accumulations and also making the grate section as a whole easier to draw from the sand of a mold. At its extremity, each operating arm 18 is preferably provided with an annular bearing boss 22 which comes in contact with the adjacent connecting rod 23 and thereby prevents the body of the arm 18 from rubbing against said connecting rod and producing unnecessary friction.

As many rows of oscillatory grate sections A may be employed as required by the dimensions of the furnace and in connection with each row of such grate sections, I employ a pair of connecting rods 23 as clearly indicated in Fig. 5, the said connecting rods lying beneath and being protected by the overhanging flanges 9 of the intervening supporting bar 1, which prevents the siftings from the grate from falling upon the connecting rods or bars 23 and the pivotal connections between said bars and the operating arms 18 of the adjacent grate sections. Each arm 18 is shown as connected to one of the rods or bars 23 by means of pivot 24 which is inserted through a smooth hole in the arm 18 and threaded into an opening in the respective connecting rod 23 where is is fixedly held by means of a set screw 25 screwed into the rod 23 and binding against the threaded portion of the pivot 24. This prevents any possibility of the pivot 24 working loose and permitting the arm 18 to become disconnected from the rod 23. It will be noted by reference to Figs. 1, 2 and 3 that one of the connecting rods 23 is pivotally associated with one group of oscillatory grate sections, said group being composed of every alternate grate bar section. The other connecting rod 23 is similarly associated with the remaining grate bar sections.

Each of the connecting rods 23 is actuated independently of the other by means of a manually operated lever designated generally at B and comprising a base section 26 and a detachable section 27. The base or main section 26 is operatively connected with the respective connecting rod 23 by means of a telescopic coupling rod designated generally at C and comprising a tubular member 28 and a rod-like member 29 which is slidable in the member 28 and held at any desired adjustment by means of a binding screw 30 carried by the member 28. The coupling rod C is pivotally connected at 31 to the respective connecting rod 23 and is pivotally connected at 32 to the base section 26 of the lever B, said base section being shown as fulcrumed at 33 on an arm or bracket 34 fastened to the front wall of the furnace.

The section 26 of the lever B is formed with a socket at 35 to receive the section 27 of the lever which may be readily detached from the section 26 when not in use and the section 26 is provided with a laterally extending stop 36 which is adapted to come in contact with the front wall 7 of the furnace when the fuel supporting surfaces of the grate sections are in a common plane. The lever section 27 is also preferably constructed in such manner as to provide a stop surface 37 which also comes in contact with the front wall of the furnace and performs the same function as the stop 36.

38 designates the dead plate or coking plate at the front end of the inclined grate and just within the fuel door opening 39. 40 designates the dumping grate section the journals 41 of which are received in the sockets 5 of the supporting bar or bars. An operating connection 42 is pivotally attached to the dumping grate section 40 at 43 and extends through the front wall of the furnace where it is provided with a suitable operating handle 44.

From the foregoing description, taken in connection with the accompanying drawings, it will now be understood that the oscillatory grate sections are arranged in a rearwardly sloping series and the journals thereof being mounted in the sockets 4 and 5, even should one or more of the grate sections become warped or overheated, the shape of the sockets 4 and 5 will permit the journals of the grate sections to shift themselves in order to compensate for such warping of the grate sections without liability of any binding action, thus maintaining the grate sections in perfect working condition and relation to the supporting means therefor. The pivotal connection between the grate sections and the connecting rods 23 is protected by the overhanging flanges 9 of the supporting bars 1 thereby preventing siftings from finding their way to the pivotal connections referred to and also assisting in keeping the working parts of the grate in good condition. On account of the grate sections being alternately connected to an operating lever, every other grate section may be rocked upwardly for feeding the fuel toward the rear end of the grate and a slow movement may be imparted to the said grate sections by a corresponding movement of the lever by which said sections are operated. The grate sections are in the fire or bed of coals only for a moment or during the operation of the respective lever B thereby attaining a distinct advantage over any eccentric-operating means which has the serious defect of keeping portions of the grate sections for too long a period in the bed of coals and thereby increasing the liability of warpage of the parts. The fuel supporting surfaces of the grate sections are maintained in a common plane by means of their actuating levers and the stops above described. By reason of the special formation and arrangement of the operating arms 18 of the grate sections, the fuel supporting surfaces of said sections may be carried upwardly to and even beyond a vertical line so as to positively insure the progressive movement of the fuel while at the same time breaking up any crust or sheet-like clinkers which may form above the grate.

One of the important results achieved by this invention is the feeding of the burning material backward step by step as combustion progresses until, when it is completely burned, it is deposited on the dumping section 40 at the rear. Certain members and features of the device as combined contribute to this result and are essential to it. They consist in transversely extending grate sections arranged in series, inclined downwardly to the rear, each section being pivoted at the rear to swing upward and backward substantially into vertical position and having an arcuate front concentric with the pivot, together with means connecting the alternate grate sections in separate sets to make it possible to swing the sections of each set independently of the other set about their respective pivots, and a separately actuated drop bar in the rear.

Unless the grate sections are arranged in a downwardly inclined series, this kind of stoking cannot be accomplished efficiently or with a high enough degree of efficiency to make the apparatus commercial. Further, in order to accomplish it, it is necessary that the grate sections move alternately so that the sections of one set are in normal position to receive the fire when the sections of the other set tip up to transfer it. If, for instance, all the sections moved at once, the fire would be dumped or pockets would be formed by which the material would be held during the rocking of the sections, so that it would drop back into its original position. The arcuate front surface is also necessary to maintain a sufficient closure between the sections to prevent dropping of the fire during stoking. The manual actuation of the separate individual sets is necessary for two reasons, one is that with the ordinary mechanical stoker the grate sections which rock up into the fire are held so long in the fire in order to produce continuous operation, that they are burned and the mechanical control is very wasteful in that the consumption varies and the speed must be faster than that necessary to give complete burning of the coal. The dumping section at the rear also separately actuated and manually controlled is necessary to dispose of the burned material whenever it has sufficiently accumulated. Therefore, all these features combine in contributing to the improved result.

Another important feature of the invention is found in the short teeth or projections at the rear of the pivot which allow sufficient air space between the sections to prevent burning, which grind the clinker to prevent clogging and support the fire at this point, preventing loss of fuel both during stoking and when the grate is in normal position.

Having thus described my invention, I claim:

1. In a furnace grate, the combination with supporting means, of a rearwardly sloping series of oscillatory grate sections each embodying a plurality of grate bars, a stringer bar intersecting said grate bars between the front and rear extremities thereof, and a guard wall also intersecting said grate bars at the extremities thereof, the lower portion of the outer face of said guard wall and the adjacent extremities of the grate bars being described on the arc of a circle of which the axis of movement of the grate section is the center, the upper portion of the outer face of the guard wall being concave on an arc of which the axis of the adjacent bar is the center.

2. In a furnace grate, the combination with supporting means, of a rearwardly sloping series of oscillatory grate sections each embodying a plurality of grate bars, a stringer bar intersecting said grate bars between the front and rear extremities thereof, and a guard wall also intersecting said grate bars at the extremities thereof, the outer face of said guard wall and the adjacent extremities of the grate bars being described on the arc of a circle of which the axis of movement of the grate section is the center, the upper marginal portion of the guard wall being offset on its outer side to form a projecting ledge which overhangs the adjacent portion of the next grate section.

3. In a furnace grate, the combination with supporting means, of a rearwardly sloping series of oscillatory grate sections each embodying a plurality of grate bars, a stringer bar intersecting said grate bars between the front and rear extremities thereof, and a guard wall also intersecting said grate bars at the extremities thereof, the outer face of said guard wall and the adjacent extremities of the grate bars being described on the arc of a circle of which the axis of movement of the grate section is the center, the extremities of said grate bars farthest from the guard wall being partly curvilinear and partly rectilinear and forming clinker-crushing projections.

4. In a furnace grate, the combination with a rearwardly sloping series of oscillatory grate sections having end journals, of a supporting bar therefor embodying a substantially vertical web-like body formed with bearing sockets for said journals, said sockets being open at the top and each partly defined by a wall which is oblique with respect to the length of the supporting bar, one of said sockets having its oblique wall inclined in the opposite direction, and a dumping grate section having an end journal supported in the last named socket.

5. In a grate, the combination of a plurality of oscillatory grate sections arranged in abutting relation and in an inclined series, each section comprising parallel grate bars having rounded extremities, a stringer bar intersecting said bars adjacent to the rounded extremeties thereof and having a substantially flat side forming clinker crushing faces between the rounded extremities of said bars, a guard wall extending downwardly from the opposite extremities of said bars and described on an arc of which the axis of said section is the center, and means connecting said sections in two separate sets, each comprising alternate sections and manually controlled means for oscillating the sections of each set independently of the other set.

6. In a grate, the combination of a plurality of oscillatory grate sections arranged in abutting relation and in a series inclined downwardly and rearwardly, each section comprising a plurality of bars, the cross-sections of the bars increasing in vertical width from the rear toward the front, the axis of each section being adjacent the rear ends of the bars of that section so that in oscillating the sections swing upward and backward toward the rear of the furnace, a guard wall extending downwardly over the forward extremities of the said bars for the greater portion of the width of the bars and having the outside surface in the main described on a substantially circular arc of which the axis of said section is the center, each section having a lever arm, and separate means connected to the alternate lever arms forming two separate sets, and manually operated means coöperating with said means to oscillate the sections of each set independently of the other set.

7. A grate section for stoking grates consisting of a plurality of grate bars, a pivot at each end of the section transverse to the bars, the pivots being in alinement with each each other and with the rear ends of the bars, means connecting the ends of the bars in alinement with the pivots, each bar being of a width measured in a plane at right angles to the pivots increasing from the pivot toward the swinging ends of the grate bars, a guard wall connecting the ends of the grate bars remote from the pivots and extending downward for a considerable portion of the width of said ends of the bars an almost equal portion of the ends of the grate bars being uncovered, substantially the entire outer surface of the guard wall and the surfaces of the adjacent ends of the grate bars being formed on a circular arc concentric with the pivots, and a lever arm at right angles to the pivot.

8. In a stoking grate, the combination of a plurality of grate sections arranged in series inclined downwardly to the rear, each section having a bearing near its rear portion on which it is mounted to swing upward and backward and comprising grate bars forward of the bearing and short teeth projecting to the rear of the bearing, the guard wall extending downward over the forward extremities of the bars, the front of the sections being formed on an arc of which the axis of oscillation of said section is the center.

9. In a stoking grate, the combination of a plurality of grate sections arranged in series inclined downwardly to the rear, each section having a bearing near its rear portion on which it is mounted to swing upward and backward and comprising grate bars forward of the bearing and short teeth projecting to the rear of the bearing, the guard wall extending downward over the forward extremities of the bars, the front face of each of the said grate sections being in the form of an arc, swung from a center which is also the center of oscillation of the section of each section projecting into close relation with the guard wall of the next section to the rear.

10. A hand stoker consisting of transversely-extending grate sections in downwardly inclined series from front to rear, the sections being pivoted near their rear portions and having arcuate front portions concentric with the pivot, means connecting the alternate grate sections in separate sets, and manually controlled means for swinging the sections of each set independently of the other set about their respective pivots, the grate sections swinging upward and backward into position substantially at right angles to the grate, and a separately actuated drop bar at the rear.

11. A hand stoker consisting of transversely-extending grate sections in series inclined downwardly from front to rear, the respective sections being pivoted near their rear portions and having grate bars extending forward of the pivot, a guard wall at the front, the fronts of the sections being formed concentric with their pivots, short teeth projecting from the rear of the sections adjacent the pivots, and means for swinging the sections at different times about their respective pivots and returning them quickly to normal, the grate sections being mounted to swing upward and backward substantially to a vertical position.

12. A furnace having a fire-box provided with a grate comprising a plurality of movable sections of substantial width elongated to extend transversely of the fire-box and in normal position adjoining each other and mounted to constitute a sloping fuel-supporting surface, and means for moving alternate grate sections to bodily lift and cause the clinkers and fuel thereon to move to adjacent sloping sections and down the latter to progressive positions without materially disturbing the burning fuel, the grate-sections being formed and arranged to conjointly present and maintain a substantially continuous fuel support in both the normal and moving positions of said sections to prevent dislodgment of the fuel through the grate during the normal supporting and feeding operations of the grate.

Signed by me at Baltimore, Maryland, this 26th day of March, 1919.

CHARLES J. HUBER.

Witnesses:
EMMA AHLSLEGER,
EMMA WEHMEYER.